United States Patent
Yanoshita et al.

(10) Patent No.: US 11,926,195 B2
(45) Date of Patent: Mar. 12, 2024

(54) SEALING STRUCTURE FOR VEHICLE DOOR

(71) Applicant: Nishikawa Rubber Co., Ltd., Hiroshima (JP)

(72) Inventors: Haruka Yanoshita, Hiroshima (JP); Masaki Motodera, Hiroshima (JP); Keizo Matsuoka, Hiroshima (JP); Shuhei Nitta, Hiroshima (JP); Tatsuya Nagai, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 398 days.

(21) Appl. No.: 17/508,263

(22) Filed: Oct. 22, 2021

(65) Prior Publication Data

US 2022/0126662 A1    Apr. 28, 2022

(30) Foreign Application Priority Data

Oct. 27, 2020    (JP) .................................. 2020-179920

(51) Int. Cl.
*B60J 10/88* (2016.01)
*B60J 10/50* (2016.01)

(52) U.S. Cl.
CPC ............... *B60J 10/88* (2016.02); *B60J 10/50* (2016.02)

(58) Field of Classification Search
CPC ... B60J 10/80; B60J 10/84; B60J 10/88; B60J 10/50; B60J 10/78; B60J 5/0404
USPC .............................. 296/146.2; 49/483.1, 502
See application file for complete search history.

(56) References Cited

U.S. PATENT DOCUMENTS

2011/0051272 A1    3/2011    Murata

FOREIGN PATENT DOCUMENTS

| DE | 102017011400 A1 | 7/2018 |
| JP | S60-151123 A | 8/1985 |
| JP | S62-006121 U | 1/1987 |
| JP | H03-083112 U | 8/1991 |
| JP | H5-91935 U | 12/1993 |
| JP | H6-42337 U | 6/1994 |
| JP | 2011-051434 A | 3/2011 |
| JP | 206968552 U | 2/2018 |
| JP | 2020-032972 A | 3/2020 |

*Primary Examiner* — Dennis H Pedder
(74) *Attorney, Agent, or Firm* — Renner, Otto, Boisselle & Sklar, LLP (57) ABSTRACT

A gap formed in a front portion of a door is easily and reliably filled so that occurrence of noise is reduced. A frame front side portion retaining a glass run front side portion being inserted is provided in a front portion of a window frame. A front side of an outer panel is provided with a mirror base to which a mirror base cover is attached. A rear edge of the mirror base is provided with a rear plate portion extending to a cabin inner side. A gap is formed between the frame front side portion and the rear plate portion. An outer sealing plate portion overlapping with a cabin outer side of the mirror base is provided with a gap filling portion extending downward.

7 Claims, 8 Drawing Sheets

SEALING STRUCTURE FOR VEHICLE DOOR

CROSS-REFERENCE TO RELATED APPLICATION

This application claims priority to Japanese Patent Application No. 2020-179920 filed on Oct. 27, 2020, the disclosure of which including the specification, the drawings, and the claims is hereby incorporated by reference in its entirety.

BACKGROUND

The present disclosure relates to a sealing structure of a vehicle door.

Some vehicle doors used to date include window panes, and window frames retaining the window panes. The door including the window frame includes a glass run for sealing a gap between the window frame and the rim of the window pane (see, for example, Japanese Unexamined Utility Model Registration Application Publication No. H06-42337).

The door described in Japanese Unexamined Utility Model Registration Application Publication No. H06-42337 includes a door body constituted by an outer panel and an inner panel, and a window frame retaining a window pane. The window frame includes a lower frame that extends in the top-bottom direction along the front edge of the window pane and is open rearward. A glass run for guiding the front edge of the window pane in the top-bottom direction is inserted and retained in the lower frame. On the other hand, a front portion of the outer panel of the door body includes a rising portion extending toward the inner panel. The end of the rising portion at the cabin inner side has a flange that is joined to the inner panel.

The rising portion formed on the outer panel of the door body and the lower frame are spaced from each other in the front-rear direction, and a gap is formed between the rising portion and the lower frame. A spacer is inserted in this gap.

Japanese Unexamined Utility Model Registration Application Publication No. H05-91935 also describes similar problems and measures, and shows that a sealing member is interposed instead of the spacer of Japanese Unexamined Utility Model Registration Application Publication No. H06-42337.

SUMMARY

Since a front portion of the door body is close to a passenger seated on a seat, if a gap is present as described in Japanese Unexamined Utility Model Registration Application Publication No. H06-42337, the sound of wind blowing through this gap becomes noise, and is easily heard by the passenger. In view of this, in Japanese Unexamined Utility Model Registration Application Publication No. H06-42337, the spacer is inserted in the gap to fill the gap in order to prevent deformation of the lower frame during high-speed traveling and reduce noise.

The spacer of Japanese Unexamined Utility Model Registration Application Publication No. H06-42337, however, is a separate component from the glass run, and thus, the glass run and the spacer need to be prepared separately in manufacturing and individually assembled to an automobile, which increases the unit prices of parts and the number of steps in assembly to the automobile. Advantages of the spacer will decrease unless the spacer is disposed at a position at which the spacer reliably fills the gap. In Japanese Unexamined Utility Model Registration Application Publication No. H06-42337, however, the spacer needs to be positioned solely independently of the glass run, and the process of positioning the spacer at a predetermined position is complicated, and the positioning accuracy might be low.

In a manner similar to Japanese Unexamined Utility Model Registration Application Publication No. H06-42337, the sealing member of Japanese Unexamined Utility Model Registration Application Publication No. H05-91935 is a separate component from the glass run, and thus, problems similar to those in Japanese Unexamined Utility Model Registration Application Publication No. H06-42337 arise.

It is therefore an object of the present disclosure to reduce occurrence of noise by easily and reliably filling a gap formed in a front portion of a door.

To achieve the object, the present disclosure provides a sealing structure of a vehicle door including: a door body including an outer panel located at a cabin outer side and an inner panel located at a cabin inner side; a window frame retaining a window pane such that the window pane is allowed to be lifted and lowered freely; and a glass run attached to the window frame and configured to seal space between the window pane and the window frame, wherein a vehicle front side of the window frame is provided with a frame front side portion, the frame front side portion extending in a top-bottom direction, being open toward a vehicle rear, and being configured to retain with a glass run front side portion of the glass run being inserted in the frame front side portion, a vehicle front side of the outer panel is provided with a mirror base, a mirror base cover being attached to the mirror base, a gap is surrounded by the mirror base, the frame front side portion, and the outer panel, a portion of the glass run closer to a vehicle front than the glass run front side portion is provided with an outer sealing plate portion, the outer sealing plate portion overlapping with a cabin outer side of the mirror base, and a vehicle rear end of the outer sealing plate portion is provided with a gap filling portion extending downward toward the gap.

With this configuration, in attaching the glass run to the window frame, when the glass run front side portion of the glass run is inserted in the frame front side portion of the window frame from the vehicle rear side, the glass run front side portion is retained by the frame front side portion, and the outer sealing plate portion of the glass run overlaps with the cabin outer side of the mirror base of the outer panel. In this state, since the gap filling portion at the vehicle rear edge of the outer sealing plate portion extends downward, the sealing member at the cabin inner side of the gap filling portion fills the gap. Accordingly, wind is less likely to pass through the gap so that occurrence of noise can be reduced. In addition, since the gap filling portion is integrated as a part of the glass run, the gap filling portion can be disposed at a predetermined position, that is, a position at which the gap filling portion reliably fills the gap, by attaching the glass run to the window frame. In an assembly process of the glass run, the gap filling portion can also be assembled. Accordingly, the number of assembly processes can be reduced.

A lower side of the gap filling portion may include a coupling plate portion extending toward the vehicle front and continuous to a lower side of the outer sealing plate portion.

With this configuration, since the lower side of the gap filling portion is continuous to the lower side of the outer sealing plate portion, the gap filling portion is less likely to be deformed, and the gap filling portion can be more accurately positioned.

A belt line portion of the door body may be provided with a belt line sealing member, and a part of the gap filling portion above the coupling plate portion may be an inclined plate portion inclined to the cabin outer side toward a bottom.

With this configuration, in moving the belt line sealing member provided in the belt line portion of the door body downward for assembly, the gap filling portion can be gradually moved toward the cabin inner side with the movement of the belt line sealing member. Thus, assembly workability of the belt line sealing member can be enhanced.

A sealing member may be provided in the gap filling portion and fills the gap, and the sealing member may be disposed at a cabin inner side of the coupling plate portion. With this configuration, the sealing member can be disposed to ensure filling of the gap.

An upper portion of the coupling plate portion may include a cover plate portion, the cover plate portion covering the sealing member from above and extending to the cabin inner side.

With this configuration, since the sealing member provided at the cabin inner side of the coupling plate portion can be covered with the cover plate portion from above, wind is less likely to be blown upward so that occurrence of noise can be further reduced, and the sealing member can be easily attached to the coupling plate portion.

A hole for attaching the mirror base cover may be provided in a portion of the glass run between the gap filling portion and an edge of the outer sealing plate portion at a vehicle rear side.

With this configuration, in the case of using a fastening member, for example, in attaching the mirror base cover, the fastening member can be inserted in the hole for attaching the mirror base cover. That is, the gap filling portion is provided in addition to the hole for attaching the mirror base cover so that the sealing member can be positioned at a predetermined position.

As described above, the glass run includes the gap filling portion that fills a gap formed at the cabin outer side between the frame front side portion of the window frame and the rear plate portion of the outer panel. Thus, the gap can be easily and reliably covered so that occurrence of noise can be reduced.

DETAILED DESCRIPTION

An embodiment of the present disclosure will be described in detail with reference to the drawings. The following embodiment is merely a preferred example in nature, and is not intended to limit the invention, applications, and use of the applications.

Figure 1:
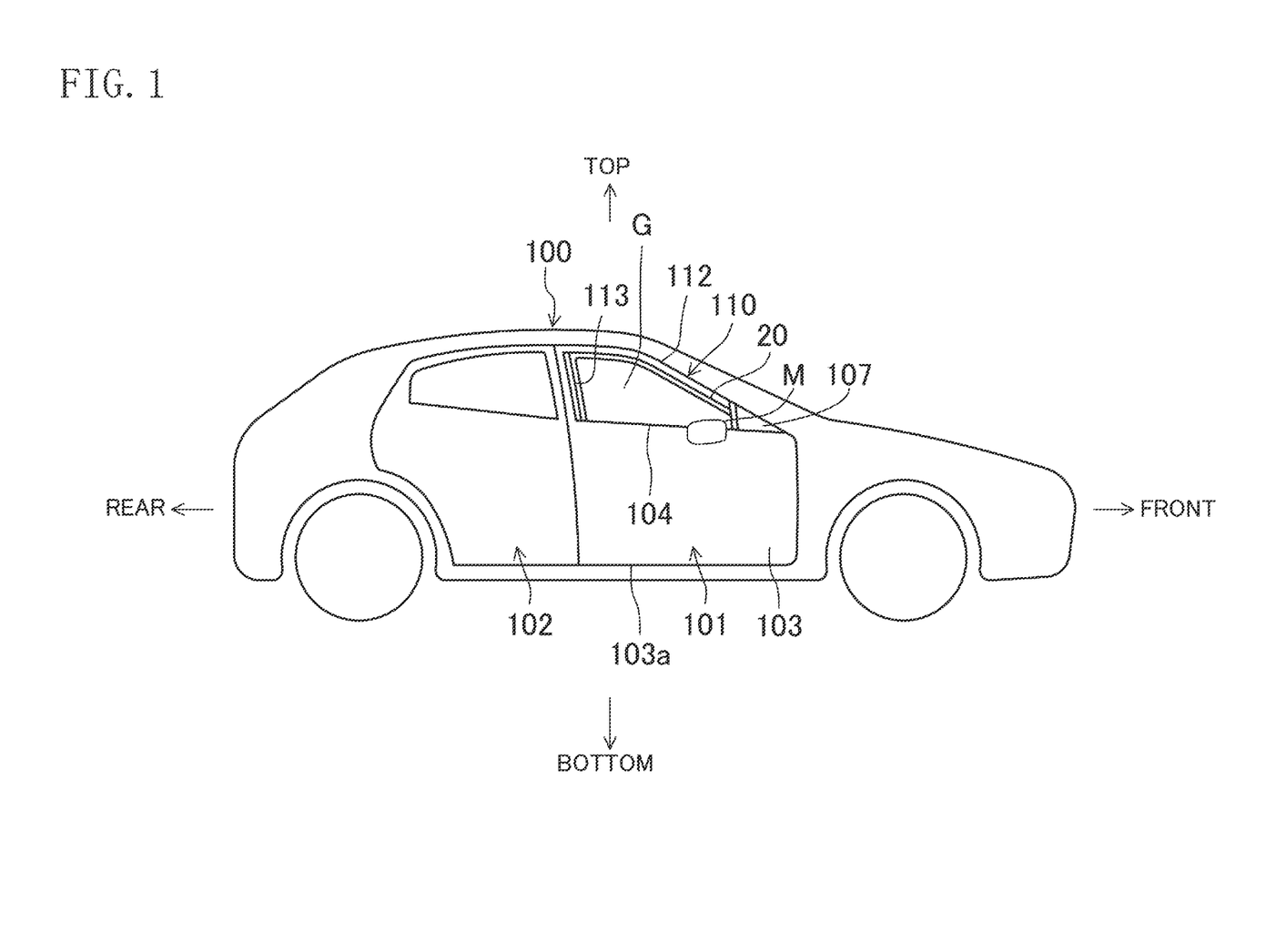
FIG. 1 is a right side view of a vehicle to which a sealing structure of a vehicle door according to an embodiment of the present disclosure is applied.

FIG. 1 is a right side view of a vehicle 100 to which a sealing structure of a vehicle door is applied. A front door 101 and a rear door 102 are provided in a side portion of the vehicle 100. The front door 101 and the rear door 102 are attached to the body of the vehicle 100 with unillustrated hinges interposed therebetween. In description of this embodiment, the vehicle front side will be referred to simply as "front," and the vehicle rear side will be referred to simply as "rear."

Configuration of Front Door

Figure 2:
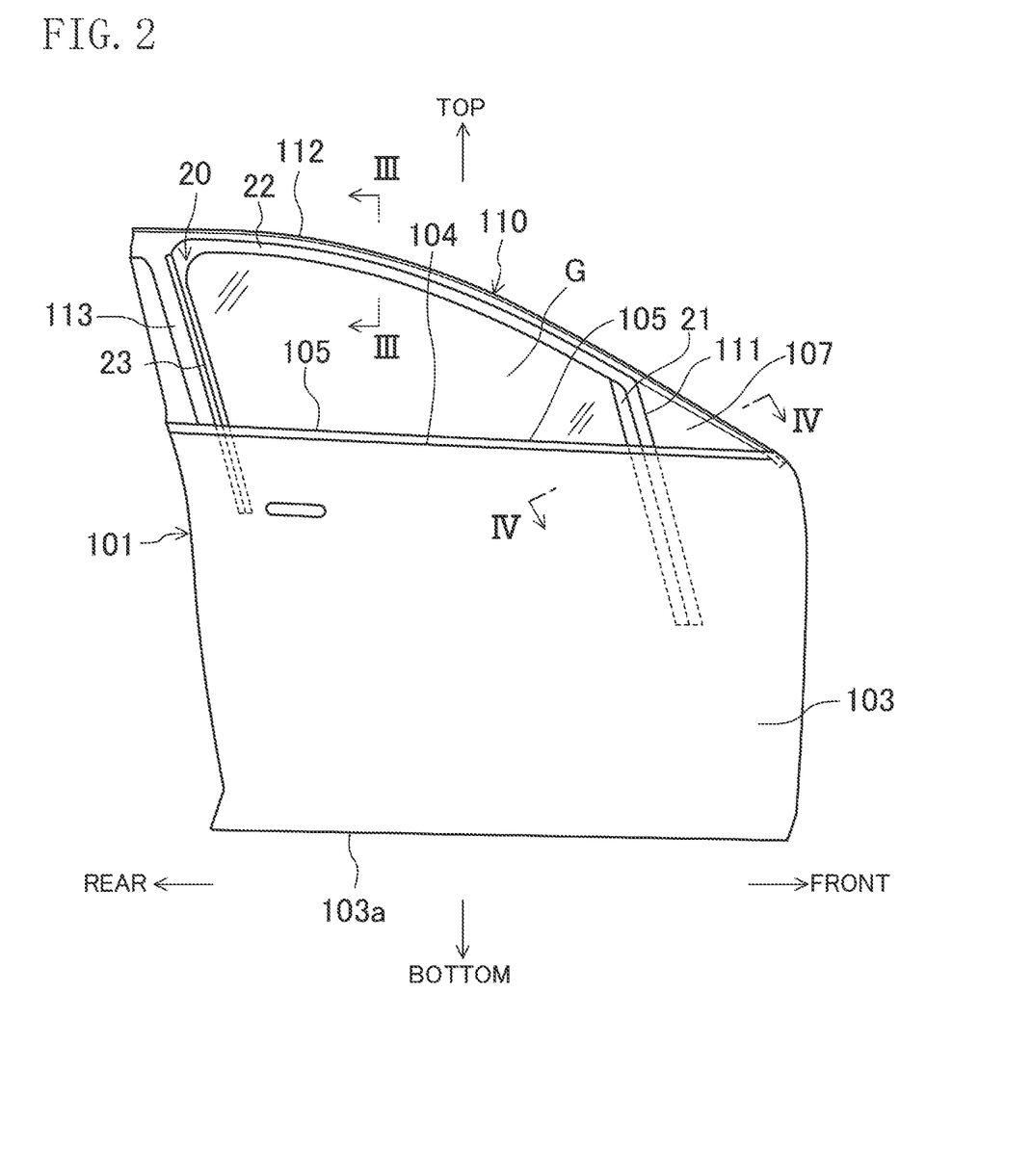
FIG. 2 is a right side view of a front door disposed at the vehicle right side.
Figure 4:
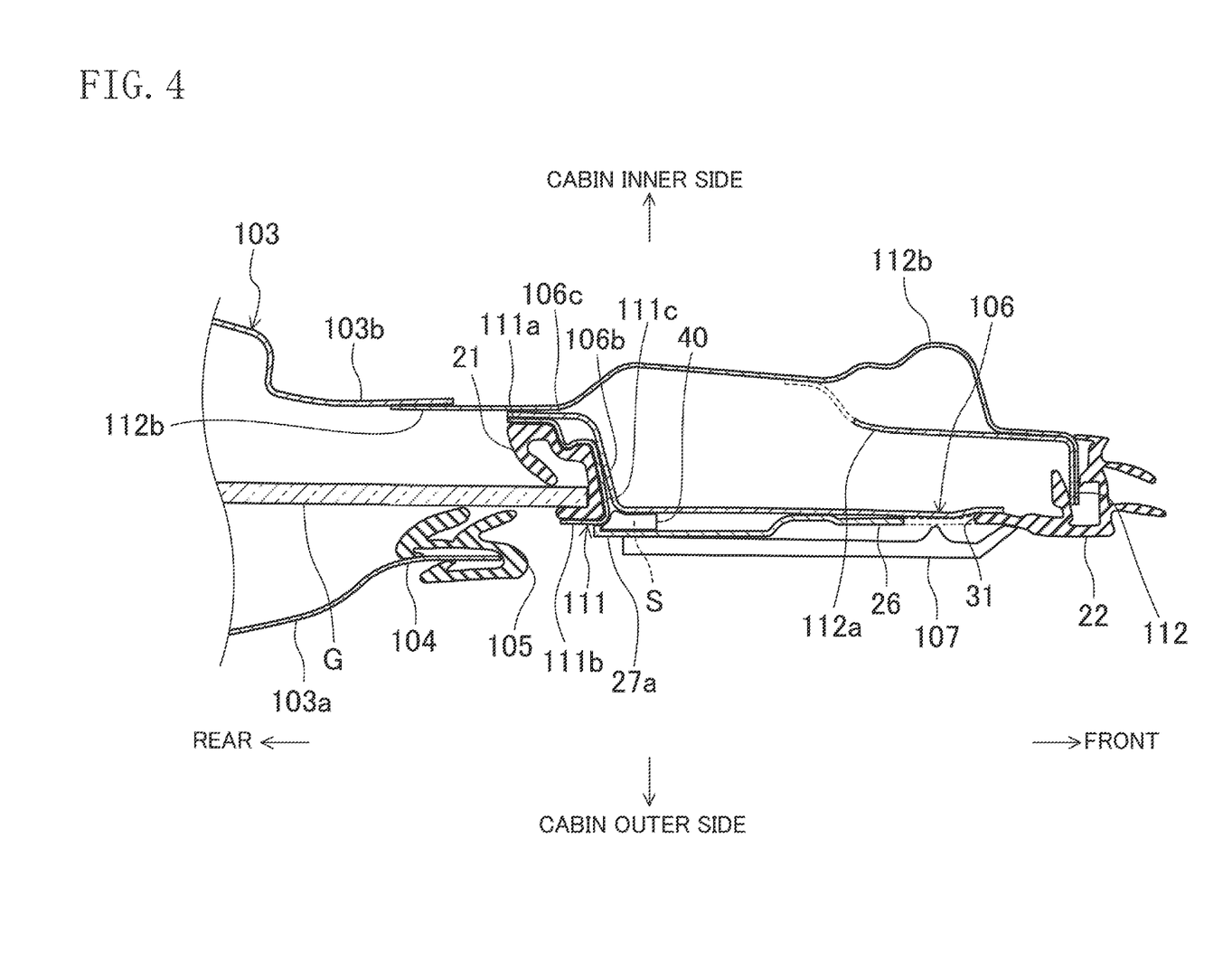
FIG. 4 is a cross-sectional view taken along line IV-IV in FIG. 2.

As illustrated in FIG. 2, the front door 101 includes a door body 103 constituting a lower half of the front door 101, a window frame 110 constituting an upper half of the front door 101, a window pane G, and a glass run 20. As illustrated in FIG. 4, the door body 103 includes a metal outer panel 103a disposed at the cabin outer side, and a metal inner panel 103b disposed at the cabin inner side. Space is formed between the outer panel 103a and the inner panel 103b.

As illustrated in FIG. 2, the upper edge of the outer panel 103a extends in the front-rear direction and constitutes a belt line portion 104. The belt line portion 104 is provided with a belt line sealing member 105. As also illustrated in FIG. 4, the belt line sealing member 105 pinches the belt line portion 104 in the inside-outside direction of the cabin, and includes an elastic material such as rubber and a core material constituted by a hard material, for example. The belt line sealing member 105 continuously extends from the front end to the rear end of the door body 103.

In assembling the belt line sealing member 105 to the door body 103, the belt line sealing member 105 is tilted such that the front end of the belt line sealing member 105 is located above the rear end of the belt line sealing member 105 with the rear end of the belt line sealing member 105 positioned to the rear end of the belt line portion 104, for example, and the front end of the belt line sealing member 105 is gradually moved downward from the tilted state to an assembled state as illustrated in, for example, FIG. 2. When the front end of the belt line sealing member 105 reaches substantially at the same height of the rear end of the belt line sealing member 105, the front end to the rear end of the belt line sealing member 105 are at normal assembled positions at which the belt line portion 104 is pinched.

The window frame 110 retains a peripheral portion of the window pane G and guides the window pane G in the top-bottom direction. The window pane G is configured to be lifted and lowered with respect to the door body 103. An elevation device (not shown) for lifting and lowering the window pane G is provided inside the door body 103, and switches the window pane G between a closed state where the window pane G is lifted and an open state where the window pane G is lowered.

The window frame 110 retains the window pane G such that the window pane G is freely lifted and lowered with the glass run 20 interposed therebetween. The window frame 110 includes a frame front side portion 111, a frame upper side portion 112, and a frame rear side portion 113. The frame front side portion 111, the frame upper side portion 112, and the frame rear side portion 113 enable the peripheral portion of the window pane G in the closed state to be retained with the glass run 20 interposed therebetween. Specifically, the frame front side portion 111 projects upward from the front side of the belt line portion 104 of the door body 103. The frame rear side portion 113 projects upward from the rear side of the belt line portion 104 of the door body 103. The upper end of the frame front side portion 111 is located below the upper end of the frame rear side portion 113. The frame upper side portion 112 extends in the front-rear direction. The front end of the frame upper side portion 112 is connected to the upper end of the frame front side portion 111. The rear end of the frame upper side portion 112 is connected to the upper end of the frame rear side portion 113. Since the upper end of the frame front side portion 111 is located below the upper end of the frame rear side portion 113, the frame upper side portion 112 is gently curved to descend gradually toward the front. This curved shape of the frame upper side portion 112 corresponds to the shape of a roof portion of the vehicle 100.

As illustrated in FIG. 4, the frame upper side portion 112 is constituted by two steel sheets of an outer 112a and an inner 112b. At the cabin outer side, the outer 112a and the inner 112b overlap with each other to form a flange to which a glass run upper side portion 22 described later is attached.

Figure 5:
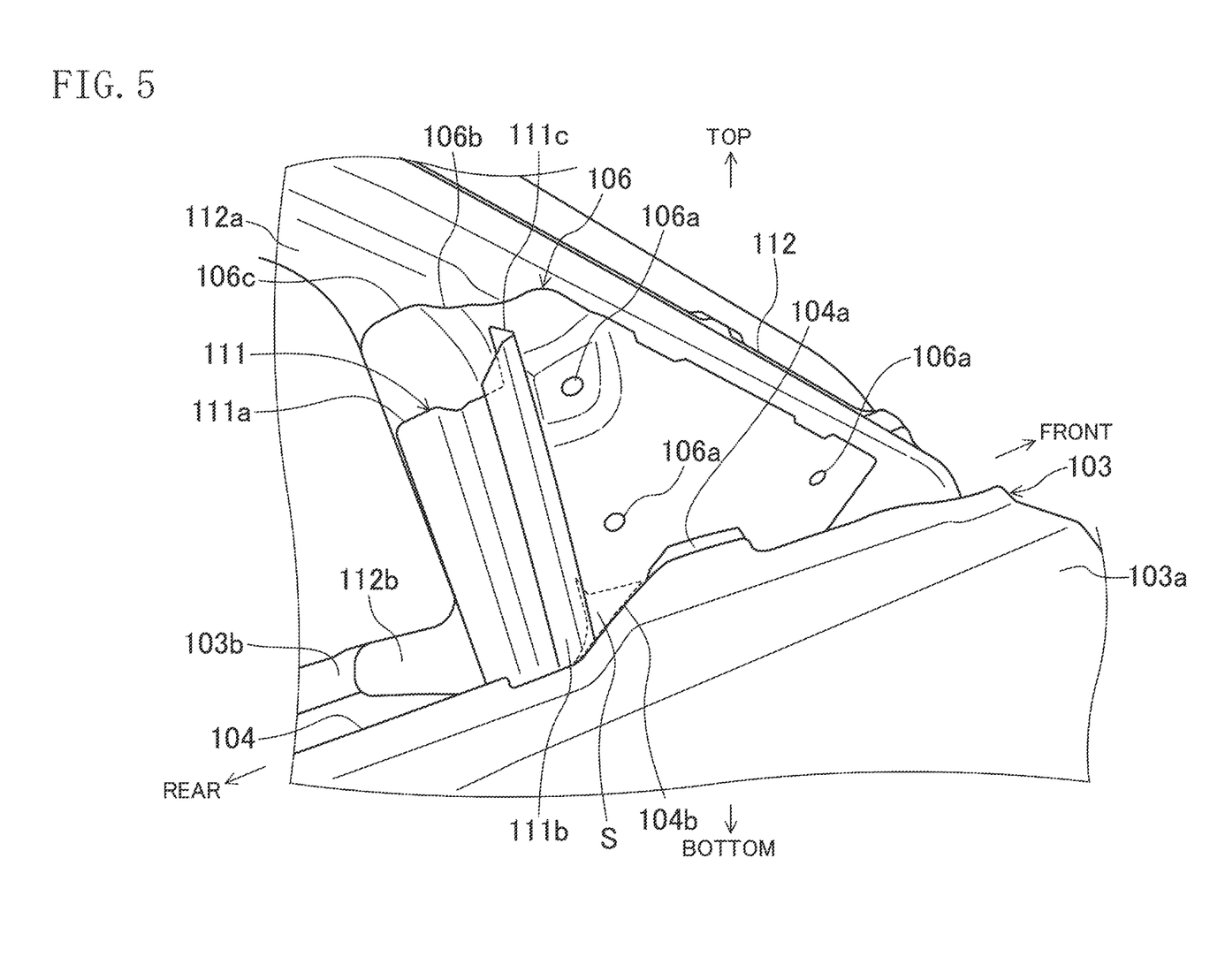
FIG. 5 is a perspective view of a front side of the front door where a glass run is not shown, when seen from the cabin outer side and from above.

As illustrated in FIG. 5, the front side of the outer panel 103a is provided with a mirror base 106 to which a mirror base cover 107 (illustrated in FIG. 4) is attached. Here, a door mirror M is attached to the front side of the outer panel 103a near the belt line portion 104 (illustrated in FIG. 1). The mirror base 106 is constituted by a plate member similar to that of the outer panel 103a, and joined to a portion of the outer panel 103a near the belt line portion 104 (a joint plate portion 104a described later) by, for example, spot welding. The mirror base 106 projects upward from the belt line portion 104 of the outer panel 103a. The mirror base 106 has a plurality of bolt insertion holes 106a in which bolts (not shown) for fastening the mirror base cover 107 are inserted. As also illustrated in FIG. 4, the rear edge of the mirror base 106 is provided with a rear plate portion 106b extending to the cabin inner side and in the top-bottom direction. The end of the rear plate portion 106b at the cabin inner side has a joint plate portion 106c extending rearward.

As illustrated in FIG. 5, the joint plate portion 106c extends in the top-bottom direction. An upper portion of the joint plate portion 106c is fixed to the outer 112a of the frame upper side portion 112 by, for example, spot welding. A lower portion of the joint plate portion 106c is fixed to the inner 112b of the frame upper side portion 112 by, for example, spot welding.

A gap S is formed to be surrounded by the mirror base 106, the frame front side portion 111, and the outer panel 103a. In addition, the inner 112b of the frame upper side portion 112 is fixed to the inner panel 103b of the door body 103 by, for example, spot welding.

As illustrated in FIGS. 4 and 5, the frame front side portion 111 extends in the top-bottom direction and is open rearward. In this embodiment, the frame front side portion 111 is tilted as a whole such that the upper end of the frame front side portion 111 is located slightly rearward of the lower end of the frame front side portion 111. Alternatively, the frame front side portion 111 may not be tilted. A glass run front side portion 21 (described later) of the glass run 20 is inserted and retained in the frame front side portion 111 (illustrated in FIG. 4).

Specifically, the frame front side portion 111 includes an inner plate portion 111a extending in the top-bottom direction at the cabin inner side, an outer plate portion 111b separated from the inner plate portion 111a to the cabin outer side and extending in the top-bottom direction, and a front plate portion 111c extending in the inside-outside direction of the cabin from the front edge of the inner plate portion 111a to the front edge of the outer plate portion 111b and in the top-bottom direction. The inner plate portion 111a is joined to the joint plate portion 106c of the mirror base 106 by, for example, spot welding. The glass run front side portion 21 of the glass run 20 is fitted between the inner plate portion 111a and the outer plate portion 111b.

The front plate portion 111c is joined to the rear plate portion 106b with the front face of the front plate portion 111c of the frame front side portion 111 being in contact with the rear face of the rear plate portion 106b of the mirror base 106. That is, the edge of the front plate portion 111c of the frame front side portion 111 at the cabin outer side is located close to the cabin outer side than the face of the mirror base 106 where the bolt insertion holes 106a are formed. Thus, the gap S is formed to be surrounded by the mirror base 106, the frame front side portion 111, and the outer panel 103a.

As illustrated in FIG. 5, the belt line portion 104 of the outer panel 103a is separated from the outer plate portion 111b of the frame front side portion 111 to the cabin outer side. Thus, more specifically, the gap S is surrounded by the cabin outer side of the mirror base 106, the cabin outer side of the rear plate portion 106b, the front side of the front plate portion 111c of the frame front side portion 111, the cabin outer side of the outer plate portion 111b, and the cabin inner side of a tilt portion 104b described later of the belt line portion 104 of the outer panel 103a.

A front portion of the belt line portion 104 of the outer panel 103a is provided with a joint portion 104a to be joined to the mirror base 106. The joint portion 104a projects upward. A portion of the belt line portion 104 rearward of the joint portion 104a extends rearward while gradually descending, and forms the tilt portion 104b. Accordingly, the gap S is open to the cabin outer side.

If the gap S is not filled, air that has entered the door body 103 during traveling of the vehicle passes through the gap S to be distributed upward. Such a flow of air becomes wind at a high flow rate and can cause noise such as wind noise. The glass run 20 is configured to reduce occurrence of this noise.

Configuration of Glass Run

Figure 3:
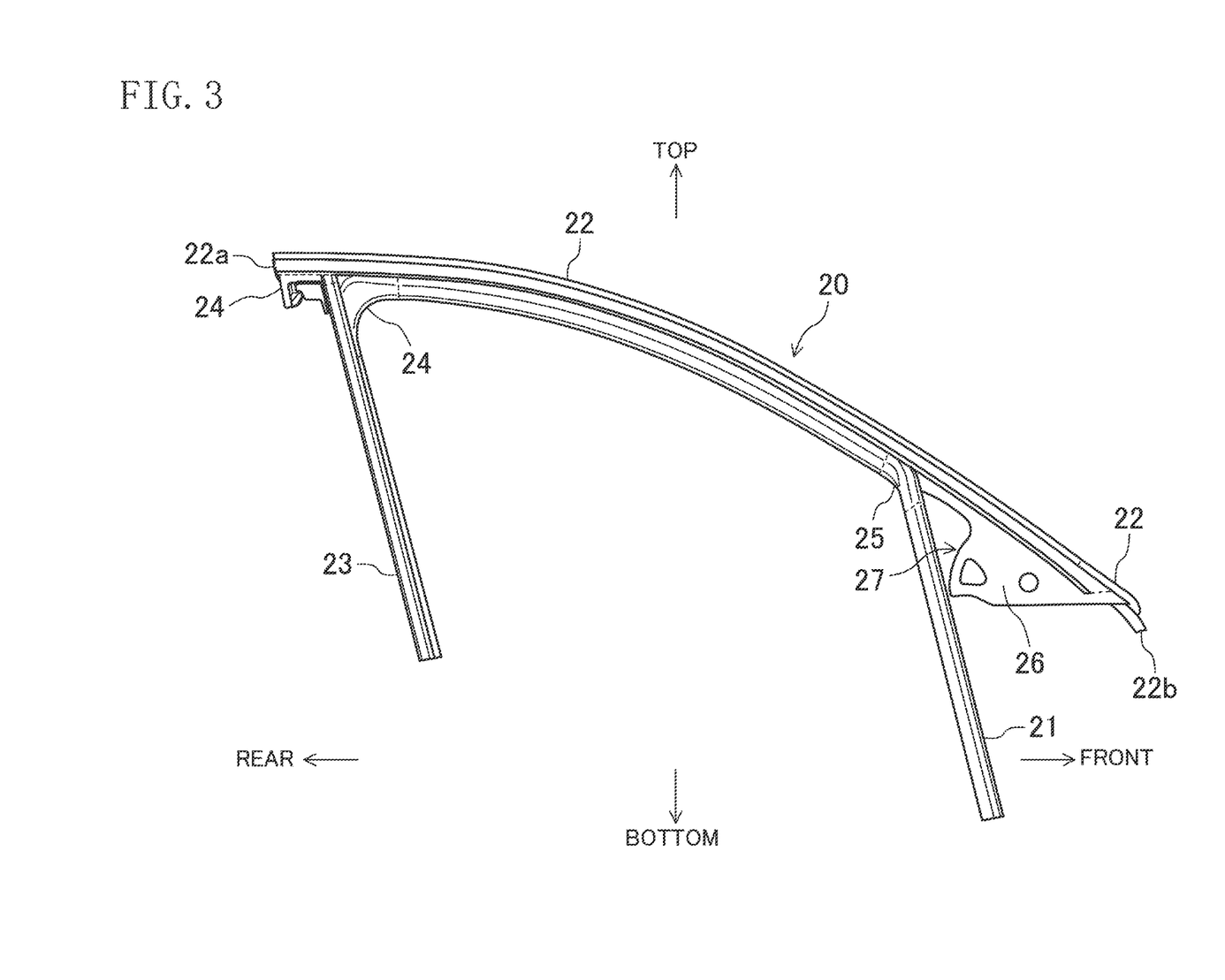
FIG. 3 is a right side view of a glass run.

The glass run 20 illustrated in FIG. 3 is a sealing member attached to the window frame 110 and sealing a gap between the window frame 110 and the window pane G. The glass run 20 is made of at least one of a resin or rubber, such as a hard resin (e.g., PP), thermoplastic elastomer (TPE), a solid (non-foamed) rubber (e.g., EPDM), or a foamed rubber (e.g., EPDM). These materials have linear expansion coefficients larger than that of a metal material constituting the window frame 110. The material for the glass run 20 may be changed among portions, and this embodiment employs a core-less structure including no metal core.

The glass run 20 includes the glass run front side portion 21 extending in the top-bottom direction along the frame front side portion 111, the glass run upper side portion 22 extending in the front-rear direction along the frame upper side portion 112, and a glass run rear side portion 23 extending in the top-bottom direction along the frame rear side portion 113. The glass run front side portion 21 is a position to be attached to the frame front side portion 111. The glass run upper side portion 22 is a portion to be attached to the frame upper side portion 112. The glass run rear side portion 23 is a portion to be attached to the frame rear side portion 113.

The glass run 20 includes a rear molded portion 24 connecting a portion of the glass run upper side portion 22 closer to the center in the front-rear direction than a rear end portion 22a of the glass run upper side portion 22 to the upper side of the glass run rear side portion 23. The glass run 20 also includes a front molded portion 25 connecting a portion of the glass run upper side portion 22 closer to the center in the front-rear direction than a front end portion 22b of the glass run upper side portion 22 to the upper side of the glass run front side portion 21.

The boundary between the rear molded portion 24 and each of the glass run upper side portion 22 and the glass run rear side portion 23 is indicated by a broken line. The boundary between the front molded portion 25 and each of the glass run upper side portion 22 and the glass run front side portion 21 is also indicated by a broken line.

An outer sealing plate portion 26 (also illustrated in FIG. 4) to overlap with a portion of the mirror base 106 at the cabin outer side is provided on a portion of the glass run 20 located forward of the glass run front side portion 21. The outer sealing plate portion 26 is integrally formed with a front portion of the glass run upper side portion 22 located forward of the glass run front side portion 21, and extends downward from the front portion. As illustrated in FIG. 4, the outer sealing plate portion 26 extends in the top-bottom direction and in the front-rear direction in a manner similar to the face of the mirror base 106 at the cabin outer side, and is disposed between the mirror base 106 and the mirror base cover 107 to be pinched by the mirror base 106 and the mirror base cover 107 in the thickness direction.

The glass run front side portion 21, the glass run upper side portion 22, and the glass run rear side portion 23 illustrated in FIG. 3 are extrusion molded portions formed by extruding an elastic material from an extrusion die. On the other hand, the rear molded portion 24, the front molded portion 25, and the outer sealing plate portion 26 are portions formed by injecting a material into a molding die configured to be opened and closed. In molding the rear molded portion 24, the glass run upper side portion 22 and the glass run rear side portion 23 can be integrated with the rear molded portion 24 interposed therebetween. In molding the front molded portion 25, the glass run upper side portion 22 and the glass run front side portion 21 can be integrated with the front molded portion 25 interposed therebetween, and the outer sealing plate portion 26 can be integrated with the glass run upper side portion 22. Here, examples of materials usable as the rear molded portion 24, the front molded portion 25, and the outer sealing plate portion 26 include thermoplastic elastomer (TPE), which is a type of a soft resin.

Figure 6:
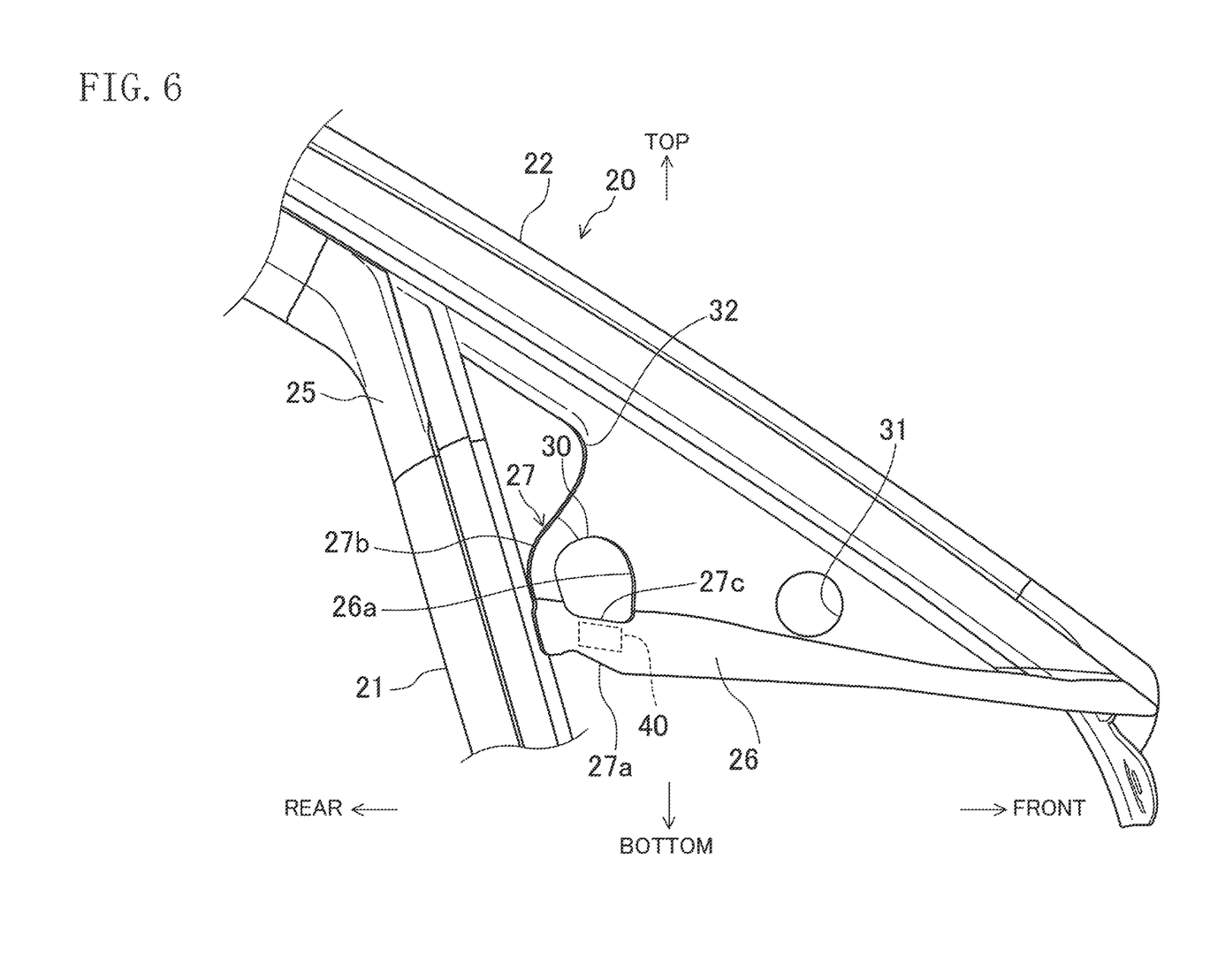
FIG. 6 is an enlarged view of a front portion of the glass run when seen from the cabin outer side.
Figure 7:
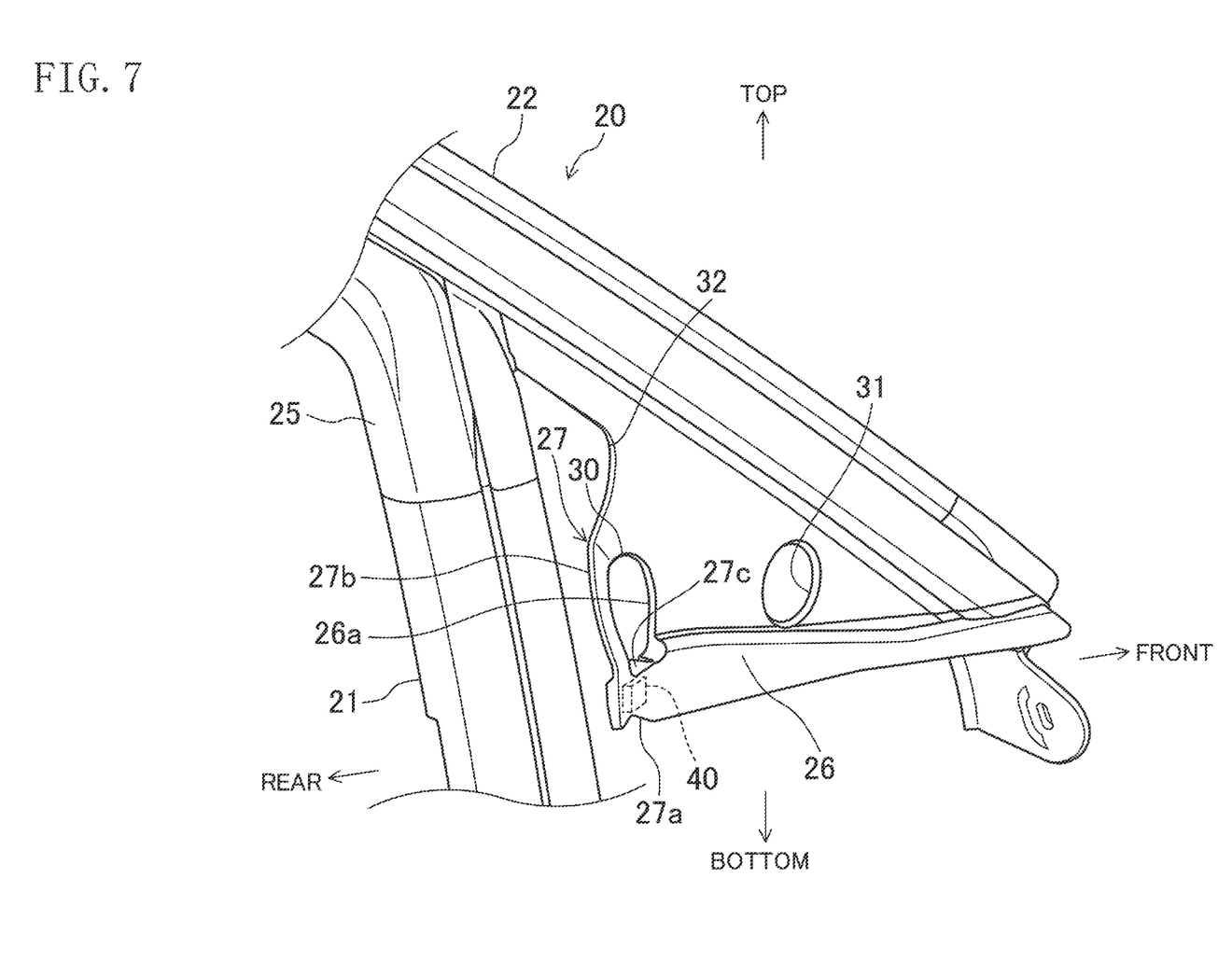
FIG. 7 is an enlarged view of the front portion of the glass run when seen from the cabin outer side and obliquely from rear.
Figure 8:
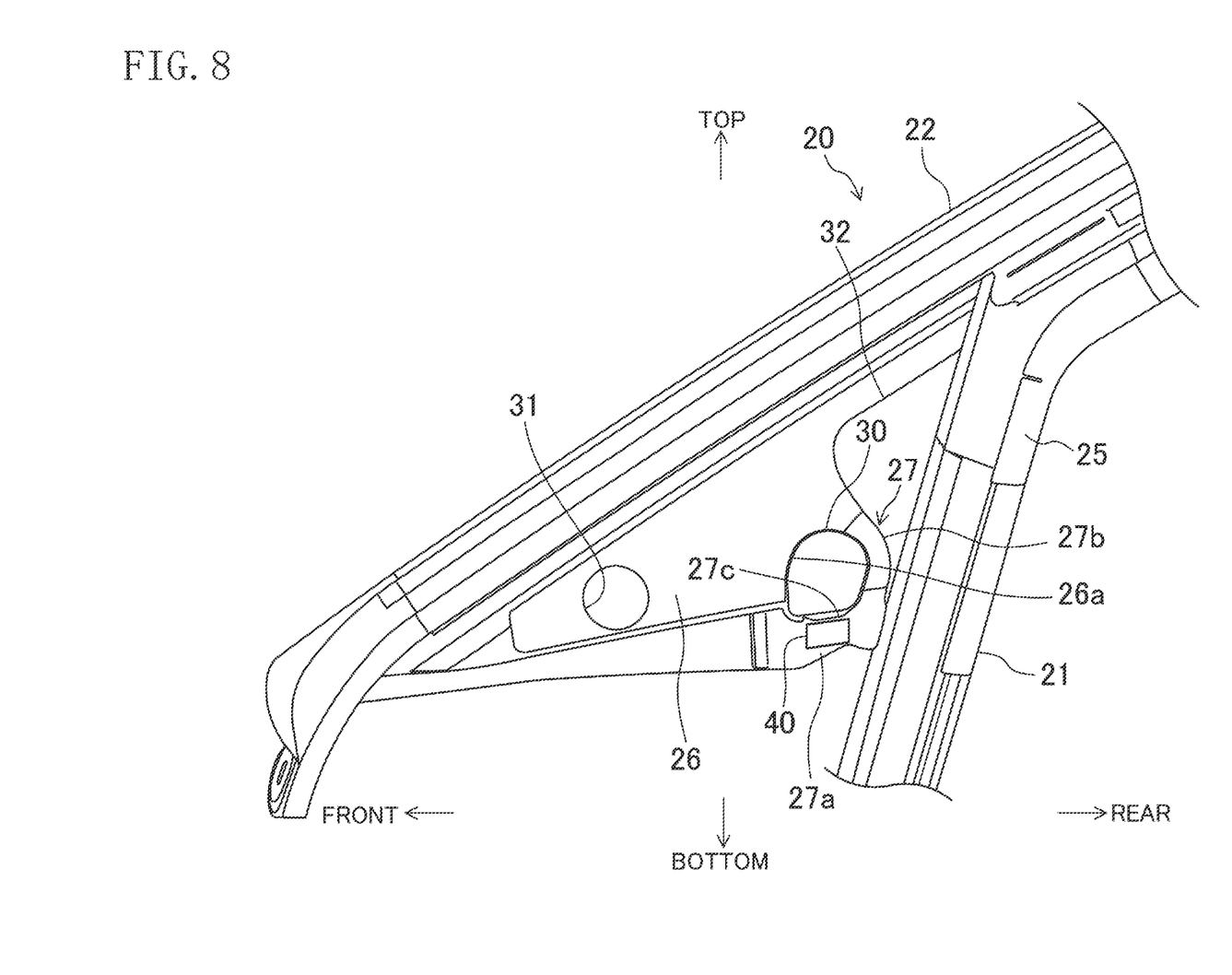
FIG. 8 is an enlarged view of the front portion of the glass run when seen from the cabin inner side.

As illustrated in FIGS. 6 through 8, a gap filling portion 27 extending downward is provided at the end of the outer sealing plate portion 26 at the vehicle rear side. The gap filling portion 27 extends rearward from an intermediate portion in the top-bottom direction of a rear edge 26a of the outer sealing plate portion 26, is bent downward, and then extends toward the gap S. The lower side of the gap filling portion 27 includes a coupling plate portion 27a extending forward and continuous to the lower side of the outer sealing plate portion 26. The coupling plate portion 27a is a part of the gap filling portion 27.

The front side of the coupling plate portion 27a is continuous to the lower side of the rear edge 26a of the outer sealing plate portion 26. Accordingly, a hole is formed between the gap filling portion 27 and the rear edge of the outer sealing plate portion 26 in the glass run 20. This hole is used as a hole 30 for attaching the mirror base cover. The outer sealing plate portion 26 has another hole 31 forward of the hole 30, and has a recess 32 above the hole 30. The recess 32 is used for attaching the mirror base cover. The hole 30 for attaching the mirror base cover, the other hole 31, and the recess 32 coincide with the bolt insertion holes 106a of the mirror base 106.

A portion of the gap filling portion 27 above the coupling plate portion 27a is an inclined plate portion 27b inclined to the cabin outer side toward the bottom. The inclined plate portion 27b is a part of the gap filling portion 27. In moving the belt line sealing member 105 downward for assembly, the presence of the inclined plate portion 27b enables the gap filling portion 27 to be gradually moved toward the cabin inner side with the movement of the belt line sealing member 105. Accordingly, the gap filling portion 27 is less likely to be jammed between the belt line sealing member 105 and the belt line portion 104 of the outer panel 103a so that assembly workability of the belt line sealing member 105 can be enhanced.

A sealing member 40 for filling the gap S is provided at the cabin inner side of the coupling plate portion 27a of the gap filling portion 27. The sealing member 40 is, for example, made of a foamed material obtained by foaming an elastic resin material, and has hermeticity that hardly allows air to pass therethrough. The sealing member 40 is attached to the surface of the coupling plate portion 27a at the cabin inner side. In attaching the sealing member 40 to the coupling plate portion 27a, a double face tape, an adhesive, or a tackiness agent, for example, can be used. The sealing member 40 may be integrally formed with the coupling plate portion 27a by, for example, coinjection molding. The sealing member 40 may be formed by cutting a long foamed material in predetermined dimensions, for example. The sealing member 40 may be rectangular or cubic, for example, and has a face attachable to the coupling plate portion 27a. The sealing member 40 may have any shape other than the shapes described above.

As illustrated in FIG. 4, the sealing member 40 is disposed to cover the gap S from above. The position in the front-rear direction and the height of the sealing member 40 can be set depending on the attachment position of the sealing member 40 to the coupling plate portion 27a. The position of the sealing member 40 in the inside-outside direction of the cabin can be set depending on the position of the coupling plate portion 27a in the inside-outside direction of the cabin. The position of the coupling plate portion 27a in the inside-outside direction of the cabin can be set depending on the shape of a molding die in die molding the coupling plate portion 27a. Since the sealing member 40 covers the gap S from above, the gap S can be filled from above. At this time, since the sealing member 40 is made of an elastic material, the sealing member 40 can be closely adhered to and in contact with the front side of the front plate portion 111c, the cabin outer side of the outer plate portion 111b, the cabin outer side of the mirror base 106, the cabin outer side of the rear plate portion 106b, and the upper edge of the belt line portion 104. This can reduce distribution of air from space surrounded by the sealing member 40, the front side of the front plate portion 111c, the cabin outer side of the outer plate portion 111b, the cabin outer side of the mirror base 106, the cabin outer side of the rear plate portion 106b, and the upper edge of the belt line portion 104, and wind hardly blows upward from the inside of the door body 103. Accordingly, occurrence of noise can be reduced.

In an upper portion of the coupling plate portion 27a, a cover plate portion 27c covering the sealing member 40 from above extends toward the cabin inner side. The cover plate portion 27*c* also extends in the front-rear direction along the upper surface of the sealing member 40, and can serve as a positioning unit or a mark in bonding the sealing member 40 to the coupling plate portion 27*a*, for example. Since the sealing member 40 can be covered with the cover plate portion 27*c* from above, wind does not easily flow upward so that noise can be further reduced. The cover plate portion 27*c* may be omitted.

Advantages of Embodiment

As described above, in this embodiment, in attaching the glass run 20 to the window frame 110, the glass run front side portion 21 of the glass run 20 is inserted in the frame front side portion 111 of the window frame 110 from the vehicle rear side so that the glass run front side portion 21 is retained by the frame front side portion 111, and the outer sealing plate portion 26 of the glass run 20 overlaps with the cabin outer side of the mirror base 106. In this state, since the gap filling portion 27 of the outer sealing plate portion 26 has a portion extending downward toward the gap S, the sealing member 40 at the cabin inner side of the gap filling portion 27 is disposed to fill the gap S. Accordingly, wind is less likely to pass through the gap S, and thus, occurrence of noise can be reduced.

In addition, since the sealing member 40 is integrated with the gap filling portion 27 constituting a part of the glass run 20, the sealing member 40 can be disposed at a predetermined position, that is, a position at which the sealing member 40 reliably fills the gap S, by attaching the glass run 20 to the window frame 110. Moreover, the sealing member 40 can be integrated with the glass run 20 in a manufacturing process of the glass run 20, and both the glass run 20 and the sealing member 40 can be assembled to the door 101 of the vehicle 100 at the same time. Thus, the number of steps of assembly to the vehicle 100 can be reduced. Although the sealing member 40 is a separate component from the gap filling portion 27 in the embodiment described above, the sealing member 40 and the gap filling portion 27 may be made of the same material and formed as one unit.

The above-described embodiment is merely an example in all respects, and should not be construed as limiting. Further, all variations and modifications belonging to the equivalent scope of the claims are within the scope of the present disclosure.

For example, although the door mirror M is attached to the outer panel 103*a* in the illustrated example, the present disclosure is also applicable to a vehicle in which a door mirror M is united with a mirror base cover 107 and attached to a mirror base 106.

A lower portion of the joint plate portion 106*c* is joined to the inner 112*b* of the frame upper side portion 112 in the illustrated example. However, the present disclosure is not limited to this example.

Although the inner 112*b* of the frame upper side portion 112 and the inner panel 103*b* of the door body 103 are separately formed and overlapped with each other to be fixed in the illustrated example, the inner 112*b* and the inner panel 103*b* may be formed from a single steel plate such that a lower portion of the joint plate portion 106*c* is directly fixed to the inner panel 103*b*.

As described above, a sealing structure of a vehicle door according to the present disclosure is applicable to, for example, a front door.

What is claimed is:

1. A sealing structure of a vehicle door, the sealing structure comprising:

a door body including an outer panel located at a cabin outer side and an inner panel located at a cabin inner side;

a window frame retaining a window pane such that the window pane is allowed to be lifted and lowered freely; and a glass run attached to the window frame and configured to seal space between the window pane and the window frame, wherein a vehicle front side of the window frame is provided with a frame front side portion, the frame front side portion extending in a top-bottom direction, being open toward a vehicle rear, and being configured to retain a glass run front side portion of the glass run being inserted in the frame front side portion, a vehicle front side of the outer panel is provided with a mirror base, a mirror base cover being attached to the mirror base, a gap is surrounded by the mirror base, the frame front side portion, and the outer panel, a portion of the glass run closer to a vehicle front than the glass run front side portion is provided with an outer sealing plate portion, the outer sealing plate portion overlapping with a cabin outer side of the mirror base, and a vehicle rear end of the outer sealing plate portion is provided with a gap filling portion extending downward toward the gap.

2. The sealing structure for the vehicle door according to claim 1, wherein a lower side of the gap filling portion includes a coupling plate portion extending toward the vehicle front and continuous to a lower side of the outer sealing plate portion.

3. The sealing structure for the vehicle door according to claim 2, wherein a belt line portion of the door body is provided with a belt line sealing member, and a part of the gap filling portion above the coupling plate portion is an inclined plate portion inclined to the cabin outer side toward a bottom.

4. The sealing structure of the vehicle door according to claim 2, wherein a sealing member is provided in the gap filling portion and fills the gap, and the sealing member is disposed at a cabin inner side of the coupling plate portion.

5. The sealing structure for the vehicle door according to claim 4, wherein an upper portion of the coupling plate portion includes a cover plate portion, the cover plate portion covering the sealing member from above and extending to the cabin inner side.

6. The sealing structure for the vehicle door according to claim 2, wherein a hole for attaching the mirror base cover is provided in a portion of the glass run between the gap filling portion and an edge of the outer sealing plate portion at a vehicle rear side.

7. The sealing structure of the vehicle door according to claim 3, wherein a sealing member is provided in the gap filling portion and fills the gap, and the sealing member is disposed at a cabin inner side of the coupling plate portion.

\* \* \* \* \*